US008879088B2

(12) United States Patent
Kiuchi

(10) Patent No.: US 8,879,088 B2
(45) Date of Patent: Nov. 4, 2014

(54) PRINTING APPARATUS, CONTROL METHOD THEREOF, AND STORAGE MEDIUM FOR REQUIRING AUTHENTICATION INFORMATION TO DISCHARGE PRINTED SHEETS

(71) Applicant: Canon Kabushiki Kaisha, Tokyo (JP)

(72) Inventor: Yohei Kiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/748,347

(22) Filed: Jan. 23, 2013

(65) Prior Publication Data

US 2013/0194610 A1 Aug. 1, 2013

(30) Foreign Application Priority Data

Jan. 26, 2012 (JP) ................................. 2012-014377

(51) Int. Cl.
*G06F 15/00* (2006.01)
*G06K 1/00* (2006.01)
*G06F 3/12* (2006.01)
*G06K 15/00* (2006.01)

(52) U.S. Cl.
CPC ............ *G06F 3/1238* (2013.01); *G06F 3/1264* (2013.01); *G06F 3/1222* (2013.01); *G06F 3/1285* (2013.01)
USPC ......................................... 358/1.14; 358/1.13

(58) Field of Classification Search
CPC ... G06F 3/1264; G06F 3/1222; G06F 3/1285; G06F 3/1238; G06K 15/02
USPC ................. 358/1.1, 1.14, 1.13, 1.15
See application file for complete search history.

(56) References Cited

U.S. PATENT DOCUMENTS 6,126,163 A * 10/2000 Katsuta et al. ................. 271/223
2010/0290088 A1 * 11/2010 Ito ................................ 358/1.16

FOREIGN PATENT DOCUMENTS

JP       2010-228113 A    10/2010

* cited by examiner

*Primary Examiner* — Douglas Tran
(74) *Attorney, Agent, or Firm* — Canon USA, Inc., IP Division

(57) ABSTRACT

In an environment under which there are mixedly an output destination that requires authentication for extracting a printed product and an output destination that does not require the authentication for extracting the printed product, a printed product is subjected to post-processing.

7 Claims, 20 Drawing Sheets

FIG.5

| NAME OF OUTPUT DESTINATION | DEVICE CAPACITY INFORMATION | | | | | | | SECURITY |
|---|---|---|---|---|---|---|---|---|
| | WITHOUT POST-PROCESSING | STAPLING | 2-HOLE PUNCHING | MULTI-HOLE PUNCHING | Z-FOLDING | 2-FOLDING | SADDLE STITCHING BOOKBINDING | |
| STACKER 1 | ○ | × | × | ○ | × | × | × | HIGH |
| STACKER 2 | ○ | × | × | ○ | × | × | × | HIGH |
| FOLDING MACHINE | × | × | × | × | × | ○ | × | LOW |
| FINISHER TOP-TRAY | ○ | ○ | ○ | ○ | ○ | × | × | LOW |
| FINISHER BOTTOM-TRAY | ○ | ○ | ○ | ○ | ○ | × | × | LOW |
| FINISHER SADDLE-TRAY | × | × | × | × | × | × | ○ | LOW |

| PAGE RANGE | DESIGNATED OUTPUT DESTINATION | POST-DESIGNATION PROCESSING ||||||
|---|---|---|---|---|---|---|---|
| | | STAPLING | 2-HOLE PUNCHING | MULTI-HOLE PUNCHING | Z-FOLDING | 2-FOLDING | SADDLE STITCHING BOOKBINDING |
| 1-5 | STACKER 1 | — | — | — | — | — | — |
| 6-10 | STACKER 1 | ◯ | — | — | — | — | — |
| 11-35 | STACKER 1 | — | — | ◯ | — | — | — |
| 36-38 | FINISHER TOP-TRAY | — | — | — | — | ◯ | — |

```
%!PS-Adobe-3.0

%%BeginPageSetup
<</OutputTray(Stacker1)>> setpagedevice
%%EndPageSetup

%......PS for page 1-5......

%%BeginPageSetup
<</OutputTray(Stacker1)>> setpagedevice
<</Staple3)>> setpagedevice
%%EndPageSetup %......PS for page 6-10......

%%BeginPageSetup
<</OutputTray(Stacker1)>> setpagedevice
<</Punch3/PunchCount(MANY)>> setpagedevice
%%EndPageSetup %......PS for page 11-35......

%%BeginPageSetup
<</OutputTray(FinisherUpperTray)>> setpagedevice
<</Fold3/FoldType2>> setpagedevice
%%EndPageSetup %......PS for page 36-38......
```

FIG.11

REPORT

Some pages are stored as Secured print.

Job Name: Secured1

Stored page number in the original job: 6-10

FIG.13

| | Time | Job Name | User Name | Status | Ap. Wait Time |
|---|---|---|---|---|---|
| | *1302* | *1303* | *1304* | *1305* | *1306* |
| ✔ | 10:48 | Secured1 | Operator | Secured Print | ---mins |
| | 10:48 | Secured2 | Operator | Secured Print | ---mins |
| | 10:49 | Secured3 | Operator | Secured Print | ---mins |
| | 10:49 | Secured4 | Operator | Secured Print | ---mins |
| | 10:50 | Secured5 | Operator | Secured Print | ---mins |

Secured Print

Stop *1307*

Secured Print *1308*

| PAGE RANGE (1001) | OUTPUT DESTINATION (1002) | POST-AUTHENTICATION OUTPUT (1003) |
|---|---|---|
| 1-5 | STACKER 1 | NO |
| 6-10 | FINISHER TOP-TRAY | YES |
| 11-35 | STACKER 1 | NO |
| 36-38 | FOLDING MACHINE | NO |

FIG.16

| NAME OF OUTPUT DESTINATION | SETTING PLACE | DEVICE CAPACITY INFORMATION | | | | | | | | SECURITY |
|---|---|---|---|---|---|---|---|---|---|---|
| *1501* | *1502* | WITHOUT POST-PROCESSING | STAPLING | 2-HOLE PUNCHING | MULTI-HOLE PUNCHING | Z-FOLDING | 2-FOLDING | SADDLE STITCHING BOOKBINDING | CASE BOOKBINDING | *1504* |
| | | *1511* | *1512* | *1513* | *1514* | *1515* | *1516* | *1517* | *1518* | |
| Printer #1 | Room #1 | ○ | ○ | ○ | ○ | ○ | ○ | ○ | × | HIGH |
| Printer #2 | Room #2 | ○ | ○ | ○ | × | × | × | × | ○ | LOW |

FIG.17

| PAGE RANGE (1601) | DESIGNATED OUTPUT DESTINATION (1602) | POST-DESIGNATION PROCESSING (1603) | | | | | | |
|---|---|---|---|---|---|---|---|---|
| | | STAPLING (1611) | 2-HOLE PUNCHING (1612) | MULTI-HOLE PUNCHING (1613) | Z-FOLDING (1614) | 2-FOLDING | SADDLE STITCHING BOOKBINDING (1615, 1616) | CASE BOOKBINDING (1617) |
| 1-5 | Printer #1 | — | — | — | — | — | — | — |
| 6-10 | Printer #1 | ○ | — | — | — | — | — | — |
| 11-35 | Printer #1 | — | — | ○ | — | — | — | — |
| 36-38 | Printer #1 | — | — | — | — | — | — | ○ |

FIG.18

⚠ Some pages are redirected and stored as Secured print.   *1701*

Printer Name: Printer #2
Place: Room #2
Job Name: Secured1
Stored page number in the original job: 36-38

*1702*

| OK |

FIG.19

REPORT

Some pages are redirected and stored as Secured print.

Printer Name: Printer #2
Place: Room #2
Job Name: Secured1
Stored page number in the original job: 36-38

PRINTING APPARATUS, CONTROL METHOD THEREOF, AND STORAGE MEDIUM FOR REQUIRING AUTHENTICATION INFORMATION TO DISCHARGE PRINTED SHEETS

BACKGROUND OF THE INVENTION

1. Field of the Invention

The present invention relates to a printing apparatus, a control method thereof, and a storage medium.

2. Description of the Related Art

In an office or under an environment of print-on-demand (POD), when using a printing apparatus, a consideration to prevent information leakage is required. Therefore, the printing apparatus has a function for preventing an output product from being viewed or being brought out by someone.

As a function for preventing the information leakage, a post-authentication printing (secured printing) function is generally known which starts printing after sending print data to the printing apparatus and then authenticating a user based on authentication information received from the user.

Further, there is a printing apparatus that secures confidentiality by outputting a printed matter to a lockable output destination. In this case, the printing apparatus outputs in advance the print data to the lockable output destination. After that, the printing apparatus receives authentication information from a user and authenticates the user. Then, an electronic key is unlocked at the output destination.

When printing a document with high confidentiality, in the printing apparatus, it is checked that the user exists near the printing apparatus, and the printing starts or the unlocking is performed at the output destination. Thus, it is prevented that the printed matter is left or brought out, thereby improving the security.

Japanese Patent Application Laid-Open No. 2010-228113 discusses a technique to switch post-authentication printing and an output to a lockable output destination according to the number of print sheets of a print job. With the technique, if the print job has the number of print sheets of a predetermined number or more, data is printed to the lockable output destination. If the print job has the number of printed sheets less than the predetermined number, the post-authentication printing is set. As a consequence, a waiting time of the user is shortened and the security is improved.

In recent years, there has been a printing apparatus having a function for post-processing such as stapling, punching, folding, or bookbinding to an output product after printing.

However, with a printing apparatus with a lockable output destination, in many cases, there are mixedly a locked output destination and an unlocked output destination. In general, if a plurality of users outputs data to the same locked output destination, a print job of another user cannot be output until removing the output product to secure the confidentiality.

The number of output destinations of the printing apparatus is predetermined. As a consequence, under an environment of a plurality of users, the print job with low security is output to the unlocked output destination to shorten the waiting time of the user.

In the printing apparatus having the function of the post-processing such as the stapling, the punching, the folding, or the bookbinding, the output destination is limited depending on the type of the post-processing to the output product in many cases. The limitation is caused by a configuration of an inline finisher and a sheet conveyance path.

For example, there is a limitation that if the output product is subjected to the stapling by the finisher on the downstream of the sheet conveyance path, the output product cannot then be output to a stacker on the upstream thereof.

To the limitation, a print setting screen is controlled on application or a printer driver for generating a print job so that the output destination is not designated out-of the limitation due to the designation of the post-processing such as the stapling, the punching, the folding, or the bookbinding as much as possible.

However, when receiving data from a printer driver manufactured by a manufacturer different from that of the printing apparatus or application that cannot perform a complicate exclusive-control, the output destination out-of the limitation designated by the post-processing can be designated.

If designating the output destination out-of the limitation designated by the post-processing with the print job, priority is generally put on the post-processing and the output destination is different from the designation of the user. Because it is considered that the designation of the post-processing that directly influences on an output form of a printed matter is more important than the designation of the output destination.

However, in the printing apparatus with the lockable output destination, there are mixedly the output destination to which the confidentiality is secured and the output destination available for other persons. As a consequence, there is a possibility that the security deteriorates if immediately outputting data to the output destination different from the designation of the user.

SUMMARY OF THE INVENTION

According to an aspect of the present invention, a printing apparatus which is able to output a sheet to one of a first discharge unit configured to require authentication information to extract the sheet and a second discharge unit configured not to require the authentication information to discharge the sheet subjected to post-processing and extract the sheet, includes a receiving unit configured to receive a print job, and a control unit configured to control the printing apparatus to execute the post-processing to a sheet on which an image is printed by executing the print job and to output the sheet to the second discharge unit when the print job received by the receiving unit is designated to execute the post-processing and is further designated to be output to the second discharge unit, and further control the printing apparatus to store, as post-authentication print job whose printing starts after authentication using authentication information, the print job received by the receiving unit when the print job is designated to execute the post-processing and is further designated to be output to the first discharge unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a device capacity information table managed by a hard disk device (HDD) in FIG. 3 according to the first exemplary embodiment.

FIG. 7 illustrates a print setting of the print job as a processing target of the printing apparatus according to the first exemplary embodiment.

FIG. 8 illustrates the print setting of the print job in FIG. 7 according to the first exemplary embodiment.

FIG. 11 illustrates a diagram of a notification report output from a printer engine in FIG. 3 according to the first exemplary embodiment.

FIG. 13 illustrates an example of the UI screen displayed on the operation unit in FIG. 3 according to the first exemplary embodiment.

FIG. 15 illustrates an example of an output result of a print job as a processing target of the printing apparatus according to the first exemplary embodiment.

FIG. 16 illustrates an example of a device capacity information table managed by a printing apparatus according to a second exemplary embodiment of the present invention.

FIG. 17 illustrates a print setting of a print job as a processing target of a printing system according to the second exemplary embodiment.

FIG. 18 illustrates an example of a UI screen displayed on an operation unit in FIG. 3 according to the second exemplary embodiment.

FIG. 19 illustrates a notified report output from a printer engine in FIG. 3 according to the second exemplary embodiment.

DESCRIPTION OF THE EMBODIMENTS

Various exemplary embodiments, features, and aspects of the invention will be described in detail below with reference to the drawings.

<Description of System Configuration>

Figure 1:
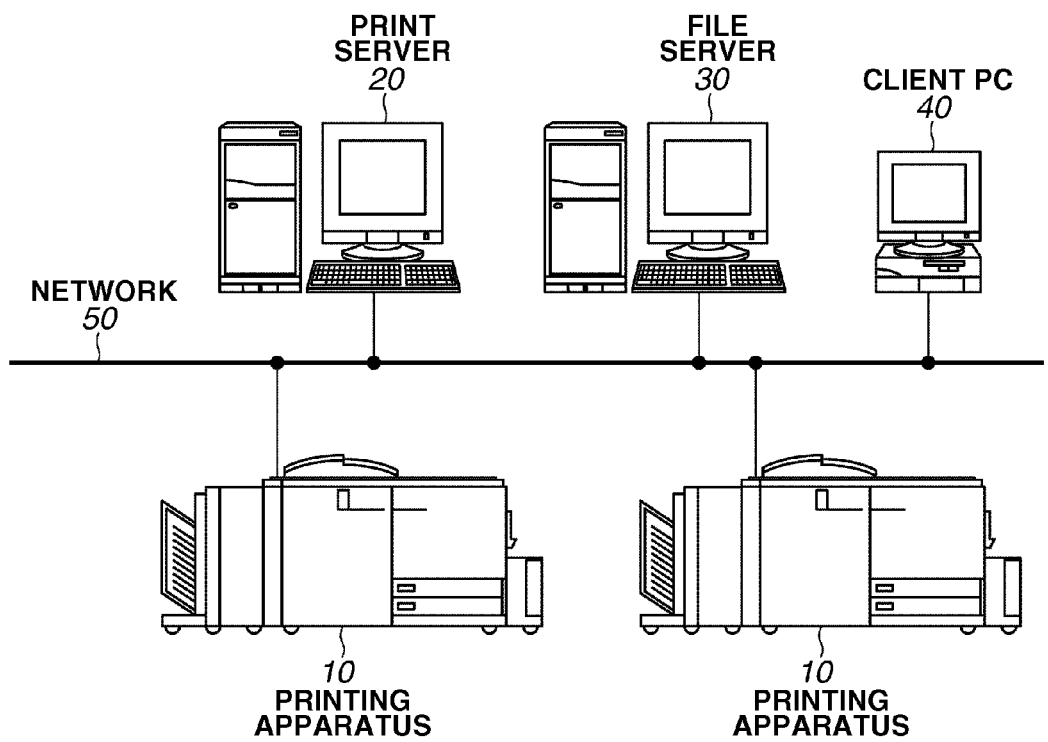
FIG. 1 illustrates an example of a configuration of a printing system according to a first exemplary embodiment of the present invention.

FIG. 1 illustrates an example of a configuration of a printing system according to a first exemplary embodiment of the present invention. In the example, a plurality of printing apparatuses 10 can be communicated with each other via a network 50, and a plurality of data processing apparatuses is connected to the network 50. The data processing apparatus includes a file server 30, a client personal computer (PC) 40, and a print server 20 that can be communicated with the printing apparatuses 10.

The printing apparatus 10 includes a first discharge unit that requires authentication of a user based on authentication information to extract a sheet, and a second discharge unit that discharges the sheet subjected to post-processing and does not require the authentication of the user based on the authentication information to extract the sheet. According to the present exemplary embodiment, a lockable discharge unit is used as an example of the first discharge unit.

The printing system in FIG. 1 includes the printing apparatuses 10, the print server 20, the file server 30, and the client personal computer (PC) 40.

The printing apparatus 10, the print server 20, the file server 30, and the client PC 40 are connected to each other to enable communication via a network 50 such as a local area network (LAN) or a wide area network (WAN). The printing apparatus 10 is an example of a multifunction peripheral (MFP) having various functions of scanning, printing, and copying.

The print server 20 manages the input print job and the printing apparatus 10 connected via the network 50. The print server 20 manages the connected printing apparatus 10. The print server 20 monitors statuses of all print jobs executed by the printing apparatus 10, and controls interruption, setting change, printing restart of the print job, or copying, shifting, or deletion of the print job.

The file server 30 stores a database (client database) used for variable printing, including client data, e.g., a destination, an address, and a name.

The client PC 40 has a function for editing an application file and instructing printing. The client PC 40 includes a function for assisting to monitor and control the print job or the printing apparatus 10 managed by the print server 20. An operator can check a status of the print job by using the client PC 40.

Figure 2:
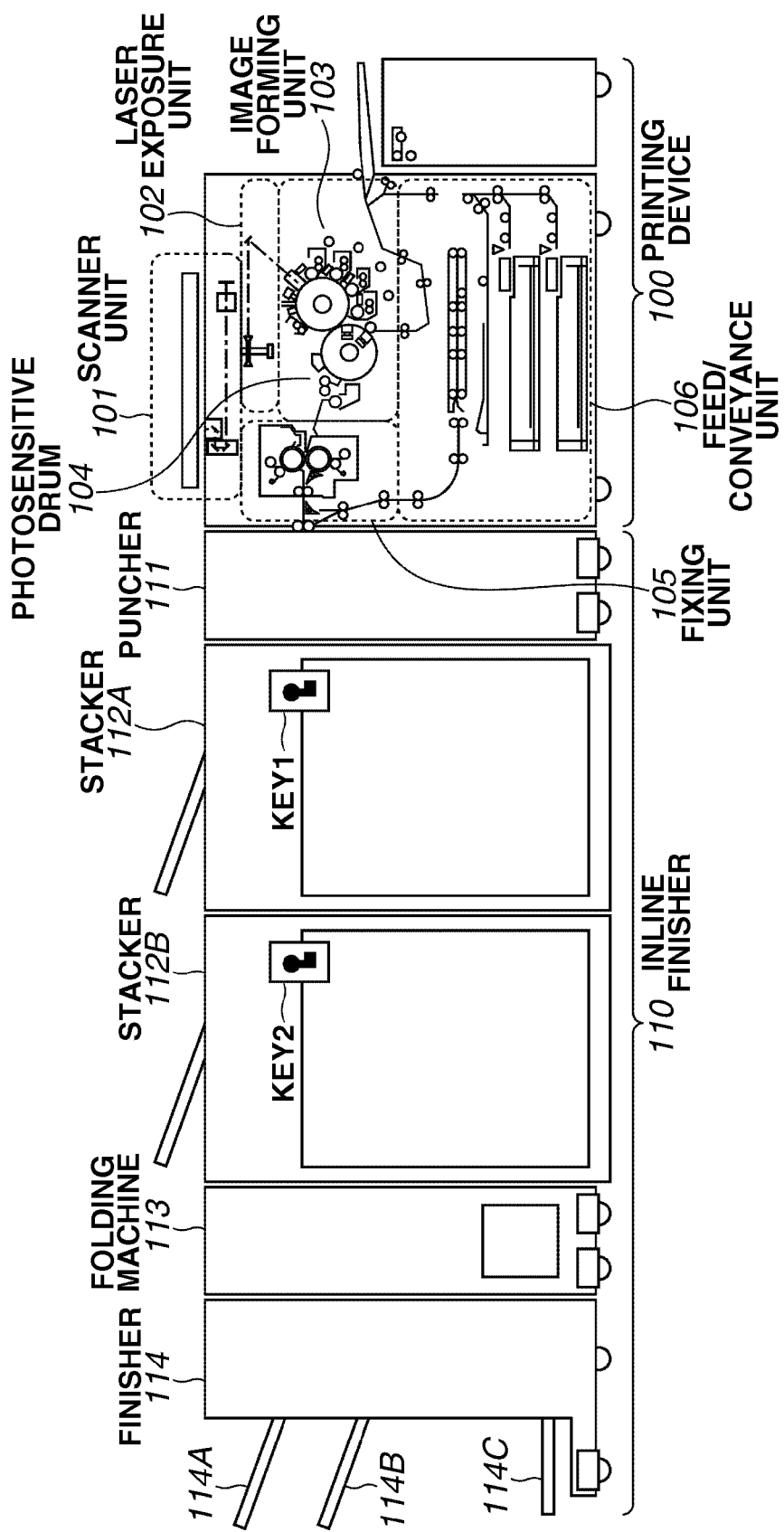
FIG. 2 illustrates an example of a printing apparatus in FIG. 1 according to the first exemplary embodiment.

FIG. 2 illustrates an example of the printing apparatus 10 illustrated in FIG. 1. Referring to FIG. 2, the printing apparatus 10 includes a printing device (printing apparatus main body) 100 and an inline finisher 110 attachable/detachable to/from the printing device 100.

The printing device 100 includes a scanner 101, a laser exposure unit 102, an image forming unit 103, a photosensitive drum 104, a fixing unit 105, and a feed/conveyance unit 106.

The scanner 101 optically reads a document image of a document placed on a platen using emitted light, converts the image into an electrical signal, and generates image data.

The laser exposure unit 102 inputs light such as a laser beam modulated according to the image data to a polygon mirror that is rotated at an equal angular speed, and emits light as reflection scanning light to the photosensitive drum 104.

The image forming unit 103 rotates the photosensitive drum 104, charges the image using a charger, develops a latent image formed on the photosensitive drum 104 by the laser exposure unit 102 using toner, and transfers a toner image to a sheet (paper sheet). The image forming unit 103 further collects minor toner remaining the photosensitive drum 104 without transfer at this time. Thus, the image forming unit 103 executes a series of electronic photographic processing to form an image.

At this time, during a period for winding the sheet to a predetermined position of a transfer belt and rotating the sheet four times, the electronic photo processing is repeatedly executed by developing units (developing stations) having toners of magenta (M), cyan (C), yellow (Y), and black (K), by turns. After four-time rotation, the sheet to which a full-color toner image with four colors is transferred is separated from the transfer drum, and is conveyed to the fixing unit 105.

The fixing unit 105 is formed by combination of a roller and a belt, includes a heat source such as a halogen heater, and dissolves and fixes the toner on the sheet to which the toner image is transferred by the image forming unit 103 with heat and pressure.

The feed/conveyance unit 106 includes at least one sheet container (feed stage), typically, e.g., a sheet cassette or a paper deck, separates one sheet from a plurality of sheets stored in the sheet container in response to an instruction of a control unit 200 (printer control unit), and conveys the sheet to the image forming unit 103 and the fixing unit 105.

The sheet is wound to the transfer drum of the image forming unit 103, and is conveyed to the fixing unit 105 after the four-time rotation. During the four-time rotation, the toner image with the YMCK colors is transferred to the sheet. When forming an image on two sides of the sheet, the sheet passing through the fixing unit 105 is controlled to pass through a conveyance path for conveying the sheet to the image forming unit 103 again.

The inline finisher 110 is attachable/detachable to/from the printing device 100, and can perform various post-processing of the sheet subjected to printing processing by the printing device 100. According to the present exemplary embodiment, as a configuration example, a puncher 111, stackers 112A and 112B, a folding machine 113, and a finisher 114 are connected to the printing device 100.

The puncher 111 can perform multi-hole punching of the sheet subjected to the printing processing of the printing device 100. The multi-hole punching is a function for punching the sheet with a die attached to the puncher 111. The number of holes of the multi-hole punching can be arbitrarily changed by exchanging the die as a punching device.

The stackers 112A and 112B hold a large amount of sheets subjected to the printing processing by the printing device 100. The stackers 112A and 112B have electronic keys KEY1 and KEY2.

The printing device 100 receives the authentication information from the user who issues an instruction of the print job, authenticates the user by using the received authentication information, and then unlocks the electronic keys KEY1 and KEY2. Regarding the authentication information, a method for inputting the authentication information from an operation unit 210 by the user may be used or a card reader unit (not illustrated) of the printing apparatus 10 may read the authentication information of the user from a card possessed by the user.

In addition, fingerprint information of the user may be read by using a fingerprint reading unit (not illustrated) in the printing apparatus 10 and may be used as the fingerprint information. Alternatively, the face of the user may be captured by a camera provided in the printing apparatus 10, and may be used as the authentication information.

The authentication information is registered in advance to a hard disk device (HDD) 208 in the printing apparatus 10 for each user, and is compared with the authentication information input by the user to authenticate the user.

The folding machine 113 can perform 2-folding and Z-folding of the sheet subjected to the printing processing by the printing device 100. With the 2-folding, each sheet is folded to half. With the Z-folding, each sheet is folded to half and one side of the folded sheet is further folded in the opposite direction. The sheet subjected to the 2-folding is output to an output destination provided for a bottom portion of the folding machine 113. The sheet subjected to the Z-folding or a sheet without the folding is conveyed to the finisher 114.

The finisher 114 can perform stapling, 2-hole punching, or saddle stitching bookbinding of the sheet subjected to the printing processing by the printing device 100. The stapling is a function for binding a plurality of sheets with a needle. The 2-hole punching is a function for punching two holes to the sheet. The saddle stitching bookbinding is a function for binding two portions near the center of a plurality of sheets with a needle and processing the sheet with a shape for folding to the left and right like a book.

The finisher 114 includes three output destinations, which are a top tray 114A, a bottom tray 114B, and a saddle tray 114C. The sheet subjected to the stapling or the 2-hole punching or the sheet without the saddle stitching bookbinding is output to the top tray 114A or the bottom tray 114B. The sheet subjected to the saddle stitching bookbinding is output to the saddle tray 114C.

The post-processing capable of being performed at the output destination is described below with reference to FIG. 5.

Figure 3:
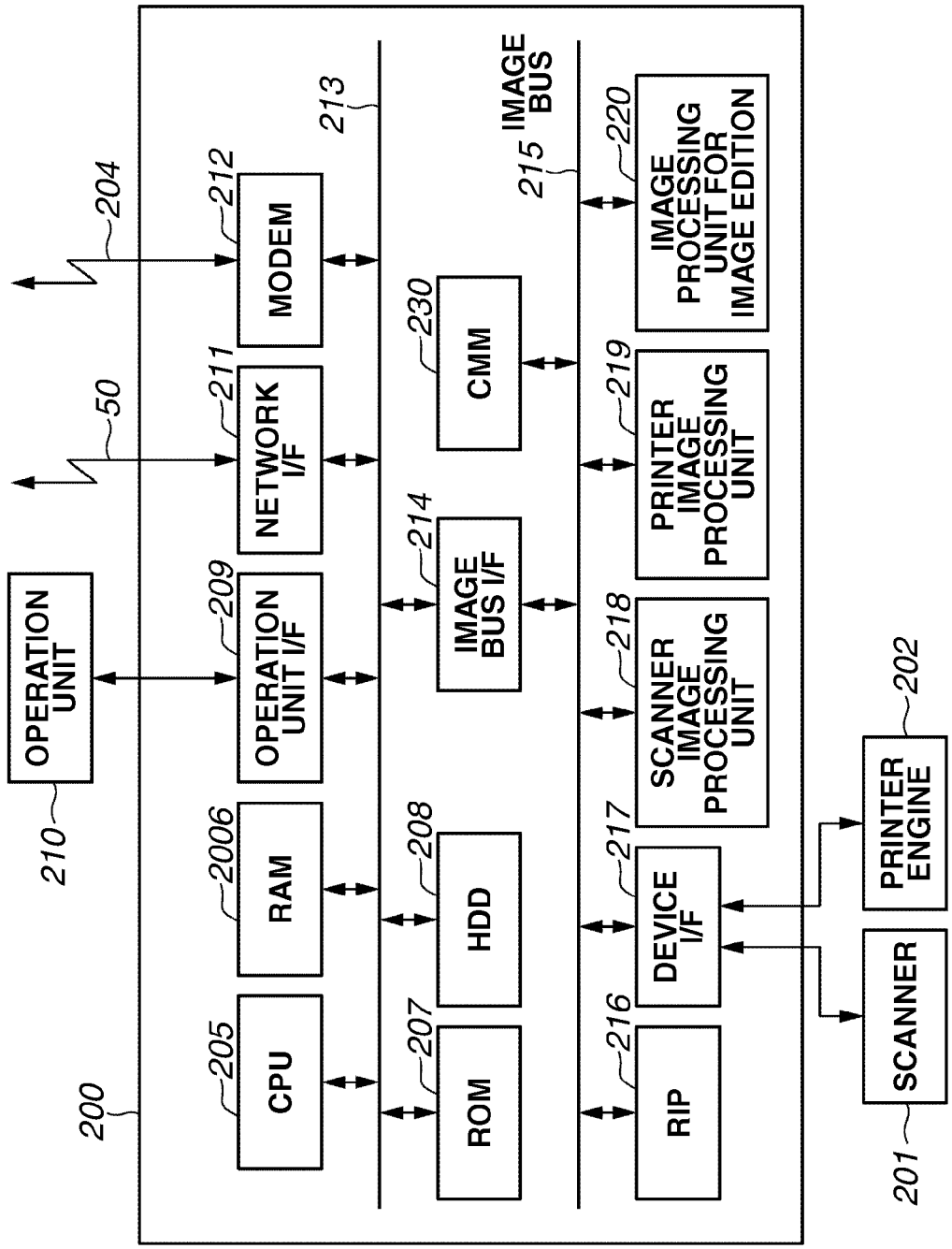
FIG. 3 illustrates a block diagram of a configuration of a control unit in the printing apparatus in FIG. 2 according to the first exemplary embodiment.

FIG. 3 illustrates a block diagram of a configuration example of the control unit (controller) 200 of the printing apparatus 10 in FIG. 2.

Referring to FIG. 3, the control unit 200 is connected to a scanner 201 as an image input device or a printer engine 202 as an image output device to read the image data or control a print output. The control unit 200 is connected to the network 50 or a public line 204, thereby controlling an input/output of image information or device information via the network 50.

A central processing unit (CPU) 205 controls the entire multifunction peripheral (MFP). A random access memory (RAM) 206 is a system memory for operating the CPU 205, and is also an image memory for temporarily storing the input image data. Further, a boot read only memory (ROM) 207 stores a boot program of the printing system.

The hard disk drive (HDD) 208 stores system software for various processing and the input image data. An operation unit interface (I/F) 209 is an interface unit to the operation unit 210 having a display screen capable of displaying the image data, and outputs operation screen data to the operation unit 210.

The operation unit interface (I/F) 209 has a function for sending information input by an operator from the operation unit 210 to the CPU 205. A network interface (I/F) 211 is realized by, e.g., a local area network (LAN) card, and is connected to the network 50 to input or output information to an external device. A modem 212 is connected to the public line 204, and inputs or outputs information from/to the external device. The units are arranged on a system bus 213.

An image bus I/F 214 connects the system bus 213 to an image bus 215 that transfers the image data at high speed, and is also a bus bridge for converting a data structure. A raster image processor (RIP) 216, a device I/F 217, a scanner image processing unit 218, a printer image processing unit 219, an image processing unit 220 for image edition, and a color management module (CMM) 230 are connected to the image bus 215.

The RIP 216 rasterizes a page description language (PDL) to a raster image. In general, the RIP processing is used for two processing of interpret processing for converting the PDL to intermediate data (i.e., display list (DL)) and rendering processing for conversion to a raster image.

According to the present exemplary embodiment, for a brief description, the RIP data is rasterized to the raster image.

Obviously, the RIP data may be temporarily converted into the intermediate data (DL) according to the present invention.

The device I/F unit 217 connects the scanner 201 or the printer engine 202 to the control unit 200 for converting a synchronous/asynchronous system of the image data.

The scanner image processing unit 218 performs various processing such as correction, processing, or edition of the image data input from the scanner 201. The printer image processing unit 219 performs processing such as correction or resolution conversion of the image data subjected to the print output corresponding to the printer engine 202.

The image processing unit 220 for image edition performs various image processing of rotation of the image data or compression/decompression processing thereof. The CMM 230 is a dedicated hardware module for performing color conversion processing (referred to as color space conversion processing) of the image data based on a profile or calibration data.

The profile is information like a function for converting color image data expressed with a color space depending on a device into a color space (e.g., Lab) independent of the device. The calibration data is for correcting color reproduction characteristics of the scanner 201 or the printer engine 202 in the color multifunction peripheral.

Figure 4:
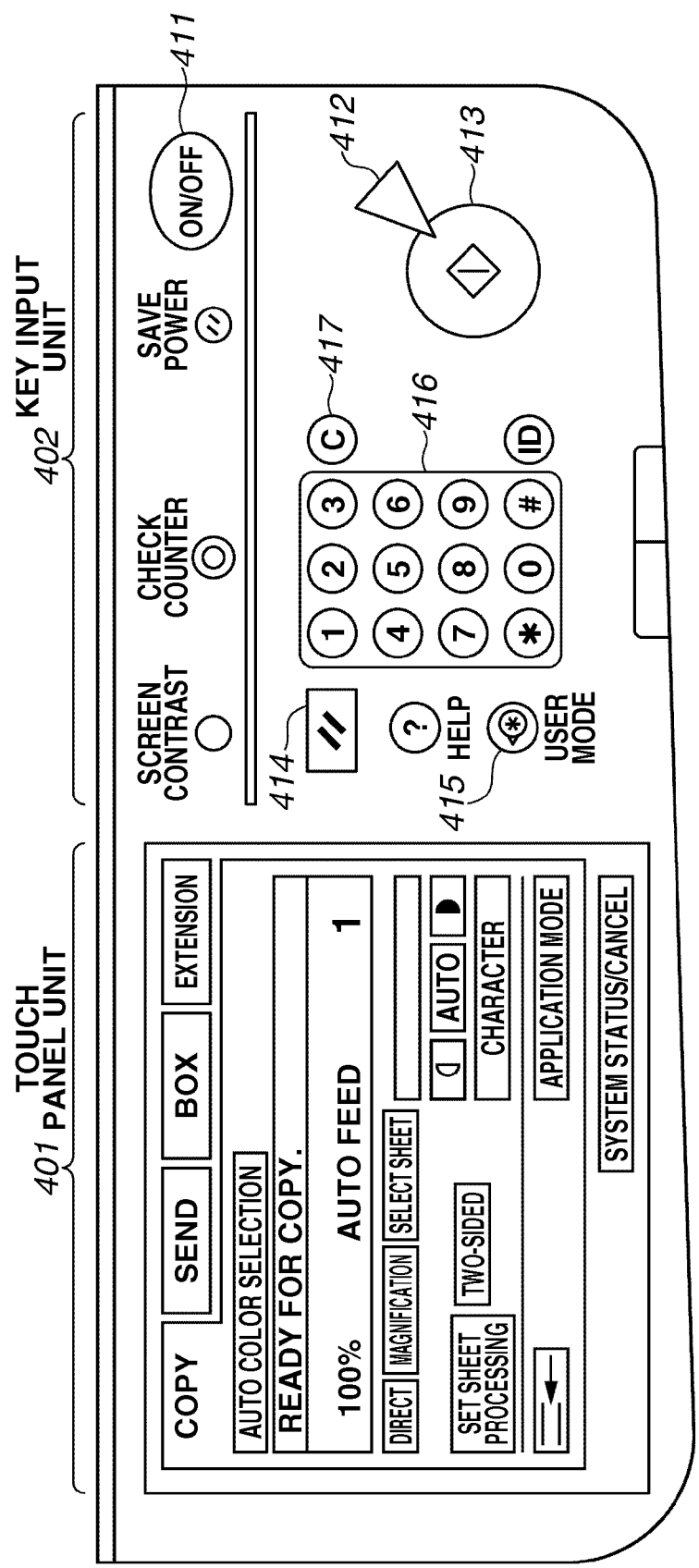
FIG. 4 illustrates a plan view of a configuration of an operation unit in FIG. 3 according to the first exemplary embodiment.

FIG. 4 illustrates a plan view of a configuration of the operation unit 210 illustrated in FIG. 3. The operation unit 210 in an example in FIG. 4 includes a key input unit 402 for enabling reception of a user operation with a hardware key, and a touch panel unit 401 as an example of a display unit that can receive the user operation with a software key (display key).

Referring to FIG. 4, the key input unit 402 includes an operation unit power switch 411. The CPU 205 controls a standby mode and a sleep mode to be selectively switched in response to the user operation of the operation unit power switch 411. However, the standby mode is a normal operation mode, and the sleep mode is a mode for stopping the program in an interrupt standby mode, provided for network printing or a facsimile machine, to suppress power consumption.

The CPU 205 controls the user operation of the operation unit power switch 411 to be received in an on-state of a main power switch (not illustrated) for supplying power of the entire system. A start key 413 enables reception of an instruction for allowing the printing device 100 to start job processing of a type instructed by the user such as a copy operation of the print job as the processing target or a sending operation from the user. A stop key 412 enables reception of an instruction for allowing the printing device 100 to interrupt processing of the received print job from the user.

A numeric keypad 416 can execute the setting of values of various settings by the user. A clear key 417 resets various parameters such as the values set by the user via the numeric keypad 416.

A reset key 414 invalidates all various settings set to the print job as the processing target by the user, and receives an instruction for returning the setting value to a default status from the user. A user mode key 415 shifts the screen to a system setting screen for each user.

FIG. 5 illustrates an example of a device capacity information table managed by the HDD 208 illustrated in FIG. 3. In the device capacity information table in the example, device capacity information is managed by associating an output destination name 501, device capacity information 502, and security 503.

The output destination name 501 is a name of the output device provided for the printing apparatus 10. The device capacity information 502 indicates whether the post-processing can be performed at the output destination as o (possible) or x (impossible). The device capacity information 502 includes non-post-processing 511, stapling 512, 2-hole punching 513, multi-hole punching 514, Z-folding 515, 2-folding 516, and saddle stitching bookbinding 517.

The security 503 indicates the intensity of the security at the output destination as high or low. According to the present exemplary embodiment, stackers 1 and 2 have the electronic keys KEY1 and KEY2. The persons other than the user who executes the print job cannot view the output product or bring the output product out. Therefore, the security of the stackers 1 and 2 is high. Another output destination does not have the similar mechanism, and the security thereof is thus low.

<Example of Print Setting of Print Job as Processing Target of Printing Apparatus 10>

Figure 6:
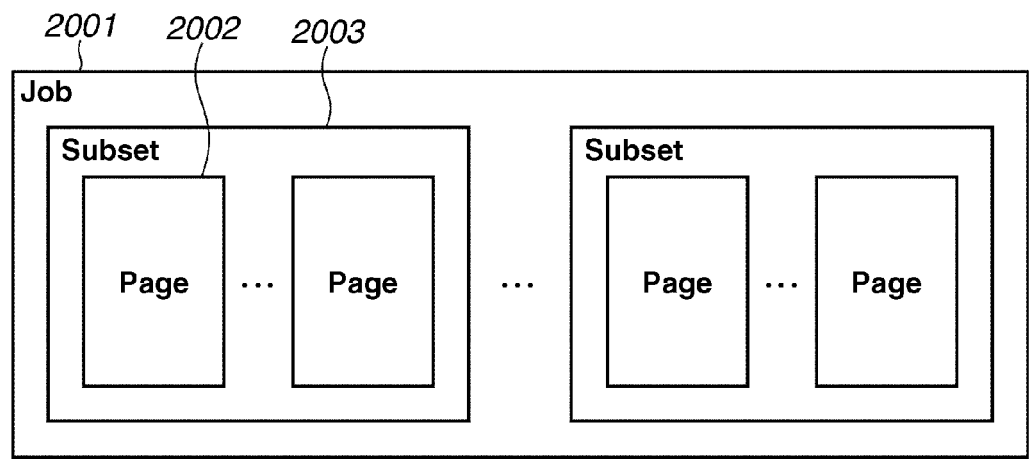
FIG. 6 illustrates a print job hierarchically processed by the printing apparatus according to the first exemplary embodiment.

FIG. 6 illustrates a relationship among a print job 2001, a sub-set 2003, and a page 2002 processed by the printing apparatus 10 in FIG. 1 with layers.

Referring to FIG. 6, the print job 2001 has one or more sub-sets 2003. The sub-set 2003 includes one or more pages 2002. The number of pages included in the sub-set 2003 is not necessarily the same number of pages, and can be different for each sub-set 2003. The printing apparatus 10 can perform post-processing different for each sub-set.

FIG. 7 illustrates an example of a print setting of the print job 2001 as a processing target of the printing apparatus 10 illustrated in FIG. 1.

Referring to FIG. 7, the print job can set a designated output destination 602 and designated post-processing 603 for each sub-set 2003 having a page range 601. The designated post-processing 603 includes designation of stapling 611, 2-hole punching 612, multi-hole punching 613, Z-folding 614, 2-folding 615, and saddle stitching bookbinding 616.

The print job contains thirty-eight pages, and is set so that the sub-set of first to fifth pages is designated to be output to the stacker 1. The sub-set of the sixth to tenth pages is designated to be output to the stacker 1. Further, the pages are subjected to the stapling to be output.

The sub-set of eleventh to thirty-fifth pages is designated to be output to the stacker 1. Further, the pages are set to be subjected to the multi-hole punching and be output. The sub-set of thirty-sixth to thirty-eighth pages is designated to be output to the top tray 114A of the finisher 114 with the 2-folding.

FIG. 8 illustrates an example of the print setting of the print job in FIG. 7 expressed by postscript (PS). The PS is a trademark or a registered trademark of Adobe Systems Incorporated in the US and other countries.

The printing apparatus 10 analyzes the PS received from the client PC 40, sets the analyzed PS as a print job, extracts the print setting illustrated in FIG. 7, and is used for the post-processing.

<Print Job Processing of Printing Apparatus 10>

Figure 9:
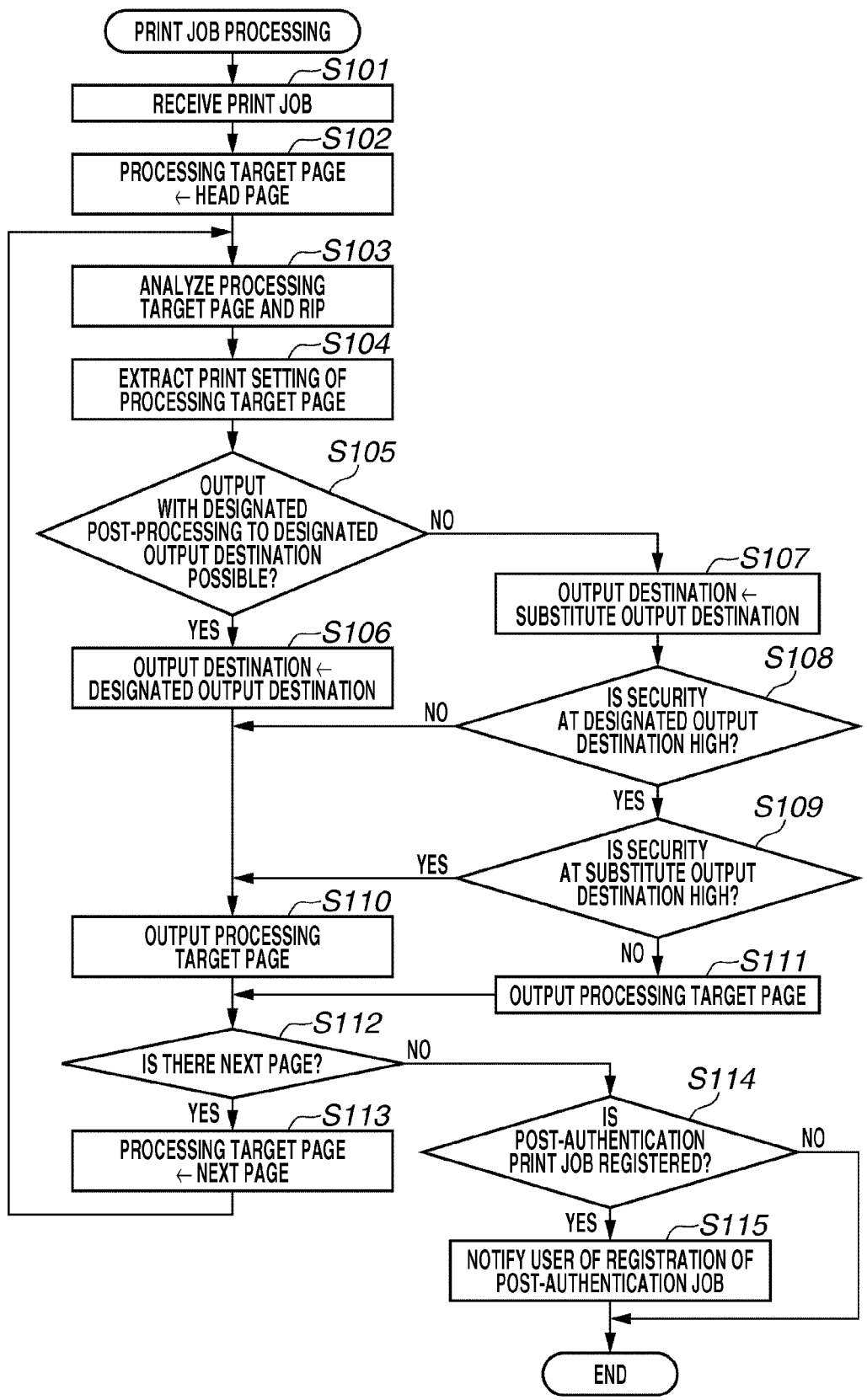
FIG. 9 illustrates a flowchart of a control method of the printing apparatus according to the first exemplary embodiment.

FIG. 9 illustrates a flowchart of a control method of the printing apparatus 10 according to the present exemplary embodiment. An example in FIG. 9 is the print job processing of the printing apparatus 10 illustrated in FIG. 1. Steps are realized by loading and executing the control program from the ROM 207 and the HDD 208 to the RAM 206 by the CPU 205. Processing is described in a case where the received print job is analyzed for each page, the first discharge unit is designated as a discharge destination, and specific post-processing is designated.

In step S101, the CPU 205 receives the print job as an example in FIG. 8 sent via the network 50, via the network I/F 211, and stores the print job to the HDD 208. In step S102, the CPU 205 sets a processing target page to a head page. In step S103, the CPU 205 performs analysis and RIP on the processing target page.

In step S104, the CPU 205 extracts the print setting of the processing target page in a form as the example in FIG. 7. In step S105, the CPU 205 determines whether the processing target page can be output with the designated post-processing 603 of the page to the designated output destination 602 of the processing target page. The determination uses the device capacity information table as the example illustrated in FIG. 5. If all the designated post-processing 603 of the processing target page can be performed (o) at the designated output destination 602 of the processing target page, all the designated post-processing 603 is performed by determining that the page can be output with the designated post-processing 603 (YES in step S105).

If the CPU 205 determines that the target page can be output with the designated post-processing 603 (YES in step S105), the processing advances to step S106. If the CPU 205 determines that the target page cannot be output with the designated post-processing 603 (NO in step S105), the processing advances to step S107.

In step S106, the CPU 205 sets the output destination to the designated output destination 602. Then, the processing advances to step S110.

In step S107, the CPU 205 selects a substitute output destination, and sets the selected destination as the output destination. The CPU 205 selects the output destination that can perform all the post-processing set to the processing target page as the substitute output destination. If there is a plurality of appropriate output destinations, the CPU 205 arbitrarily selects one of the output destinations. Further, if there is not the appropriate output destination, the CPU 205 arbitrarily selects one of the output destinations, and ignores the setting of the post-processing in the subsequent processing.

An example is described in which the CPU 205 controls job processing by determining whether the security deteriorates when the output destination is changed to the second discharge unit with the specific post-processing designated by the received print job. The second discharge unit is the top tray 114A of the finisher 114 illustrated in FIG. 2. The first discharge unit is the lockable stacker 112A or 112B.

In step S108, the CPU 205 determines whether the security 503 of the designated output destination 602 is high. If the CPU 205 determines that the security 503 of the designated output destination 602 is high (YES in step S108), the processing advances to step S109. If the CPU 205 determines that the security 503 of the designated output destination 602 is not high (NO in step S108), the processing advances to step S110.

In step S109, the CPU 205 determines whether the security 503 at the substitute output destination is high. If the CPU 205 determines that the security 503 at the substitute output destination is high (YES in step S109), the processing advances to step S110. If the CPU 205 determines that the security 503 at the substitute output destination is not high (NO in step S109), the processing advances to step S111.

In step S110, the CPU 205 outputs the processing target page by using the printer engine 202.

In step S111, the CPU 205 stores the processing target page to the HDD 208, and registers the processing target page as a post-authentication print job (secured print job) whose printing starts after the authentication. That is, the CPU 205 changes the attribute of the received print job to the secured print job, assigns the authentication information to the received print job, and registers the assigned authentication information to the storage unit (HDD 208).

The assigned authentication information may be the same as the authentication information that the user who sends the print job needs to input to extract the printed matter from the output destination designated by the print job.

As a specific sequence, the CPU 205 specifies the user who sends the print job based on a user identifier (ID) added to the print job. The CPU 205 identifies the authentication information corresponding to the specified user ID based on a table (not illustrated) stored in the HDD 208. In step S111, the CPU 205 assigns the identified authentication information to the received print job, and stores the assigned information.

The CPU 205 may not assign the authentication information for each user, but assign the authentication information determined for each output destination.

If there is a page already registered as the post-authentication print job, the CPU 205 adds the processing target page to the end of the post-authentication print job. After ending step S111, the processing advances to step S112.

In step S112, the CPU 205 determines whether the print job includes a next page. If the CPU 205 determines that the print job includes the next page (YES in step S112), the processing advances to step S113. If the CPU 205 determines that the print job does not include the next page (NO in step S112), the processing advances to step S114.

In step S113, the CPU 205 sets the processing target page to the next page. The processing advances to step S103, and the processing of pages subsequent to the next one continues.

In step S114, the CPU 205 determines whether the post-authentication print job is registered. If the print job includes the page registered as the post-authentication print job, the CPU 205 determines that the post-authentication print job is registered. If the CPU 205 determines that the post-authentication print job is registered (YES in step S114), the processing advances to step S115. If the CPU 205 determines that the post-authentication print job is not registered (NO in step S114), the print job processing ends.

In step S115, the CPU 205 notifies the user that the post-authentication print job is registered. Then, the present processing ends. As a notifying method, the CPU 205 displays the notification screen on the operation unit 210.

Figure 10:
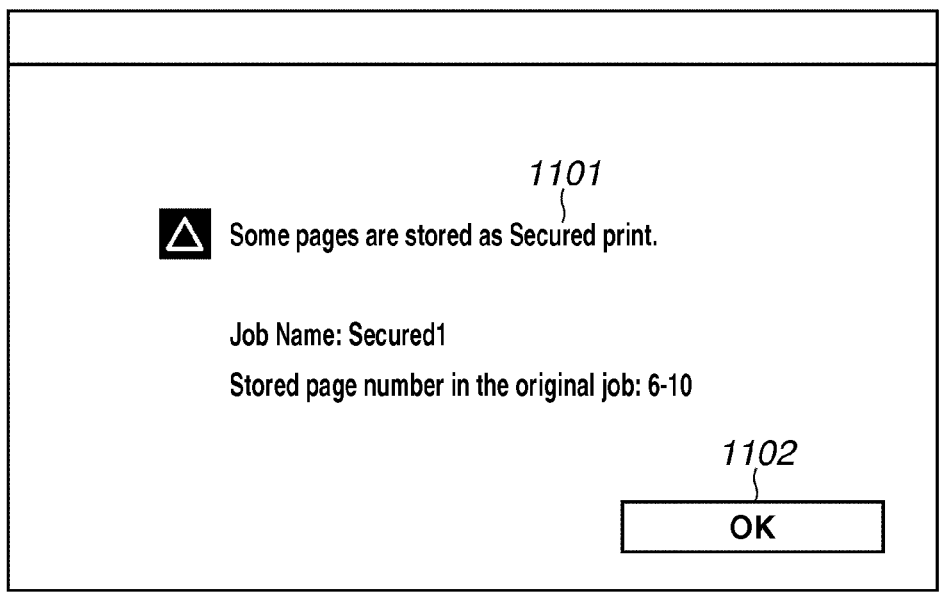
FIG. 10 illustrates an example of a user interface (UI) screen displayed on the operation unit in FIG. 3 according to the first exemplary embodiment.

FIG. 10 illustrates an example of a user interface displayed on the operation unit 210 illustrated in FIG. 3. The example indicates a notification screen for notifying the user that the post-authentication print job is registered.

In this example, the operation unit 210 displays a message 1101 for notifying the user that a part of the print job is registered as the post-authentication print job, and an OK button 1102 for ending the notification screen.

As another method, the CPU 205 outputs the notification report to the designated output destination by using the printer engine 202.

FIG. 11 illustrates an example of a notification report output from the printer engine 202 in FIG. 3. The example indicates that a message for notifying that a part of the print job is registered as the post-authentication print job is output as a report. When the above processing ends, the print job processing also ends.

<Post-authentication Printing Processing of Printing Apparatus 10>

Figure 12:
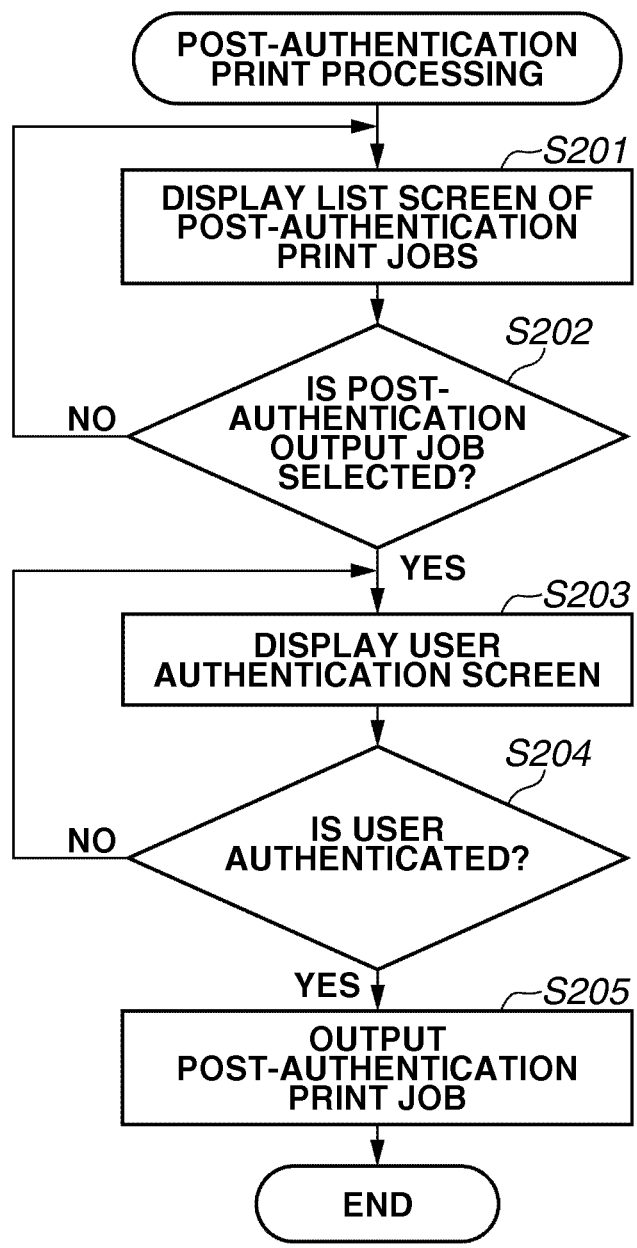
FIG. 12 illustrates another flowchart of the control method of the printing apparatus according to the first exemplary embodiment.

The post-authentication printing processing of the printing apparatus 10 according to the present exemplary embodiment is described. FIG. 12 illustrates a flowchart of a control method of the printing apparatus according to the present exemplary embodiment. An example in FIG. 12 indicates the post-authentication printing processing of the printing apparatus 10 illustrated in FIG. 1. Steps are realized by loading the control program to the RAM 206 from the ROM 207 or the HDD 208 and executing the program by the CPU 205.

In step S201, the CPU 205 displays a post-authentication print job list screen registered to the storage unit (HDD 208) in step S111 on the operation unit 210.

FIG. 13 illustrates an example of the user interface displayed on the operation unit 210 illustrated in FIG. 3. The example indicates an example of the post-authentication print job list screen.

Referring to FIG. 13, the operation unit 210 displays a post-authentication print job list 1301, a registration time 1302, a job name 1303, a user name 1304, a status 1305, a print time 1306, a cancel button 1307, and a print button 1308.

In step S202, the CPU 205 determines whether the user issues an instruction for printing the post-authentication print job via the operation unit 210. If the user selects the post-authentication print job from the post-authentication print job list 1301 and presses the print button 1308, the CPU 205 determines that the user issues the instruction for printing the post-authentication print job.

If the CPU 205 determines that the user issues the instruction for printing the post-authentication print job (YES in step S202), the processing advances to step S203. If the CPU 205 determines that the user does not issue the instruction for printing the post-authentication print job (NO in step S202), in step S201, the CPU 205 waits for the user issuing the instruction of the post-authentication print job.

In step S203, the CPU 205 displays the user authentication screen on the operation unit 210.

Figure 14:
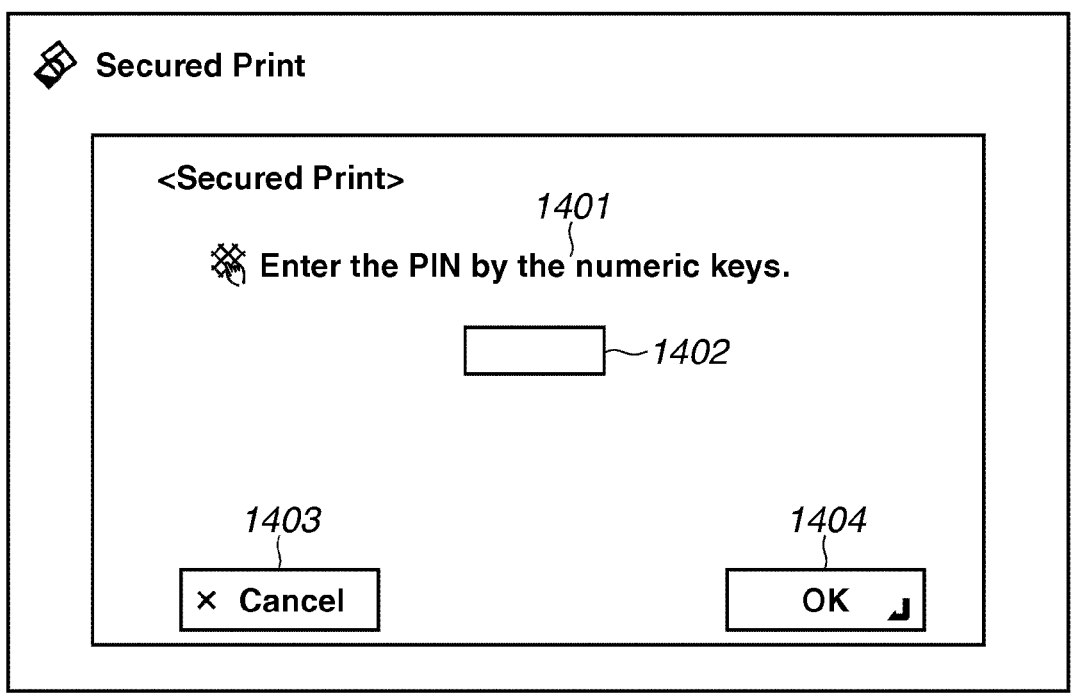
FIG. 14 illustrates an example of the UI screen displayed on the operation unit in FIG. 3 according to the first exemplary embodiment.

FIG. 14 illustrates an example of the user interface displayed on the operation unit 210 illustrated in FIG. 3. The example illustrates one user authentication screen.

Referring to FIG. 14, the operation unit 210 displays a message 1401, a password input box 1402, a cancel button 1403, and an OK button 1404

In step S204, the CPU 205 determines via the operation unit 210 whether the user is authenticated. Specifically, when the user inputs a correct password in the password input box 1402 and presses the OK button 1404, the CPU 205 determines that the user is authenticated.

If the CPU 205 determines that the user is authenticated (YES in step S204), the processing advances to step S205. If the CPU 205 determines that the user is not authenticated (NO in step S204), the processing advances to step S203. In step S203, the CPU 205 wait for the user to be authenticated.

In step S205, the CPU 205 executes the post-authentication print job by using the printer engine 202, prints an image based on the image of the post-authentication print job on the sheet, and outputs the sheet to the designated output destination. Then, the present processing ends. Then, the post-authentication printing processing also ends.

<Example of Output Result of Print Job as Processing Target of Printing Apparatus 10>

FIG. 15 illustrates an example of an output result of the print job as a processing target of the printing apparatus 10 illustrated in FIG. 1. The example illustrates an actual operation and an output result of the print job.

FIG. 15 illustrates an output destination 1002 at which a page of a page range 1001 is actually output and a post-authentication output 1003 indicating whether the page is registered as the post-authentication output job.

Referring to FIG. 15, the sub-set of first to fifth pages is designated to be output to the stacker 1 without the post-processing as illustrated in FIG. 16. Referring to the device capacity information table in FIG. 5, the sheet without the post-processing can be output to the stacker 1 (YES in step S105).

In step S106 in FIG. 9, the output destination 1002 is set to the designated output destination 602 (stacker 1). The output destination 1002 is the same as the designated output destination 602, and the security does not deteriorate. In step S110, the printing immediately starts (the post-authentication output 1003 is NO).

The sub-set from sixth to tenth pages is designated to be output to the stacker 1 with the staple, as illustrated in FIG. 7. Referring to the device capacity information table in FIG. 5, the CPU 205 determines that the sheet with the staple cannot be output to the stacker 1 (NO in step S105).

In step S107, the CPU 205 sets the output destination 1002 in FIG. 15 to the substitute output destination (top tray 114A of the finisher 114). The stacker 1 includes the electronic key KEY1. However, the top tray 114A of the finisher 114 is the output destination available for other persons who do not know the authentication information. Therefore, the security 503 at the designated output destination 602 is high (YES in step S108). The security 503 at the output destination 1002 is low (NO in step S109), and the security deteriorates due to the change of the output destination.

Therefore, the printing of the page does not immediately start. In step S111, the CPU 205 registers the page as the post-authentication print job (the post-authentication output 1003 is YES).

The sub-set of eleventh to thirty-fifth pages is designated to be output to the stacker 1 with the multi-hole punching as illustrated in FIG. 15. Referring to the device capacity information table in FIG. 5, the sheet with the multi-hole punching can be output to the stacker 1 (YES in step S105).

In step S106, the CPU 205 sets the output destination 1002 to the designated output destination 602 (stacker 1).

The output destination 1002 is the same as the designated output destination 602, and the security does not deteriorate. In step S110, the printing immediately starts (the post-authentication output 1003 is NO).

Further, the sub-set of thirty-sixth to thirty-eighth pages is designated to be output to the top tray 114A of the finisher 114 with the 2-folding as illustrated in FIG. 15. Referring to the device capacity information table in FIG. 5, the sheet with the 2-folding cannot be output to the top tray 114A of the finisher 114 (NO in step S105).

In step S107, the CPU 205 sets the output destination 1002 to the substitute output destination (folding machine).

The top tray 114A of the finisher 114 and the folding machine are available for other persons. Therefore, the security 503 of the designated output destination 602 and the output destination 1002 is low (NO in step S108). The security does not deteriorate due to the change of the output destination. In step S110, the printing immediately starts (the post-authentication output 1003 is NO).

According to the present exemplary embodiment, if the sheet whose output is designated to the output destination to which the confidentiality is secured is changed to be output to the output destination available for other persons because of the limit of the post-processing of the sheet, the printing of the sheet can be canceled and the processing can be switched to the post-authentication printing.

Thus, it is possible to improve the security by preventing the output product with high confidentiality from being viewed or brought out.

Regarding an output of a sheet whose security does not deteriorate, the printing thereof immediately starts without waiting for the authentication of the user. More specifically, regarding a sheet whose output destination is not changed, a sheet whose output is designated to the output destination available for other persons, and a sheet that is output to the output destination to which the confidentiality is secured, the printing immediately starts without waiting for the user authentication.

Thus, if the different print setting is possible to the sub-set or the page in the print job, the security can be improved while shortening the waiting time of the user.

A second exemplary embodiment of the present invention is described. According to the present exemplary embodiment, the printing system includes a plurality of printing apparatuses 10. Under an environment under which the confidentiality is secured to at least one printing apparatus 10 and at least one printing apparatus 10 is available for other persons, an example to which the present invention is applied is described. The same components as those in the first exemplary embodiment are not described.

<Configuration of Printing System>

According to the present exemplary embodiment, the configuration of the printing apparatus 10 is similar to that according to the first exemplary embodiment described with reference to FIGS. 1 and 2. Further, according to the present exemplary embodiment, a plurality of the printing apparatuses 10 is connected to the network 50, and the print job can be transferred between the printing apparatuses 10.

<Configuration of Device Capacity Information Table>

FIG. 16 illustrates an example of the device capacity information table managed by the printing apparatus 10 according to the present exemplary embodiment. According to the present exemplary embodiment, one of the two printing apparatuses 10 illustrated in FIG. 1 is arranged in Room#1 (not illustrated), and is specified as a first printing apparatus whose exit and entrance of the user is limited.

One of the two printing apparatuses 10 illustrated in FIG. 1 is arranged in Room#2 (not illustrated), and is specified as a second printing apparatus to which the exit and entrance of the user is free. The example indicates management of the device capacity information as a table in which an output destination name 1501, a setting place 1502, device capacity information 1503, and security 1504 are associated.

Referring to FIG. 16, the output destination name 1501 is the name of the output destination in the printing system. According to the present exemplary embodiment, the printing system includes a plurality of the printing apparatuses 10, and output destination names Printer#1 and Printer#2 are added thereto.

The setting place 1502 is the place of the output destination name 1501. According to the present exemplary embodiment, the Printer#1 is set in the Room#1, and the Printer#2 is set in the Room#2. The Room#1 is a lockable room, and the confidentiality is secured in the Room#1. However, the Room#2 is not locked, and is available for other persons.

The device capacity information 1503 indicates the post-processing capable of being performed at the output destination as "o" (possible) or "x" (impossible). The device capacity information 1503 includes non-post-processing 1511, stapling 1512, 2-hole punching 1513, multi-hole punching 1514, Z-folding 1515, 2-folding 1516, saddle stitching bookbinding 1517, and case bookbinding 1518.

The security 1504 indicates that the security intensity at the output destination is high or low. According to the present exemplary embodiment, the Printer#1 is set to the lockable Room#1. Since other persons except for the user who executes the print job cannot view the output product or bring the output product out, the security of the Printer#1 is high.

The Printer#2 is set in the unlocked Room#2, and other persons except for the user who executes the print job can view the output product or bring the output product out. Therefore, the security is low.

<Example of Print Setting of Print Job as Processing Target of Printing System>

FIG. 17 illustrates an example of the print setting of the print job as a processing target of the printing system according to the present exemplary embodiment.

Referring to FIG. 17, with the print job, a designated output destination 1602 and designated post-processing 1603 can be set to the sub-set of a page range 1601. The designated post-processing 1603 includes stapling 1611, 2-hole punching 1612, multi-hole punching 1613, Z-folding 1614, 2-folding 1615, saddle stitching bookbinding 1616, and case bookbinding 1607.

The print job contains thirty-eight pages. The entire sub-set is designated to be output to the Printer#1. Further, the sub-set of sixth to tenth pages is designated to be output with the stapling 1611. The sub-set of eleventh to thirty-fifth pages is designated to be output with the multi-hole punching 1613. The sub-set of thirty-sixth to thirty-eighth pages is designated to be output with the case bookbinding 1607.

<Print Job Processing of Printing System and Post-authentication Printing Processing>

According to the present exemplary embodiment, the print job processing and the post-authentication printing processing are similar to those in the first exemplary embodiment with reference to FIG. 7. FIG. 18 illustrates an example of a notification screen displayed on the operation unit 210 by the CPU 205 in step S115, which is different from that in the first exemplary embodiment.

FIG. 18 illustrates an example of the user interface displayed on the operation unit 210 illustrated in FIG. 3. The example illustrates the notification screen for notifying the user that the post-authentication print job is registered.

In the example, the operation unit 210 displays a message 1701 notifying that a part of the print job is registered as the post-authentication print job of the Printer#2, and an OK button 1702 for ending the notification screen. FIG. 19 illustrates an example of a notification report output using the printer engine 202 by the CPU 205 in step S115, different from that of the first exemplary embodiment.

FIG. 19 illustrates an example of the notification report output from the printer engine 202 illustrated in FIG. 3. In the example, a message for notifying the user that a part of the print job is registered as the post-authentication print job of the Printer#2 is output as a report.

<Example of Output Result of Print Job as Processing Target of Printing Apparatus 10>

Figure 20:
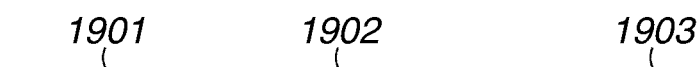
FIG. 20 illustrates an example of an output result of a print job as a processing target of the printing apparatus according to the second exemplary embodiment.

FIG. 20 illustrates an example of an output result of the print job as a processing target of the printing apparatus 10 illustrated in FIG. 1. The example indicates that an actual operation and the output result of the print job.

Referring to FIG. 20, the output result includes an output destination 1902 at which a page within a page range 1901 is actually output, and a post-authentication output 1903 indicating whether the job is registered as the post-authentication output job.

Referring to FIG. 17, the sub-set of first to fifth pages is designated to be output to the Printer#1 without the post-processing. Referring to the device capacity information table in FIG. 16, the sheet can be output to the Printer#1 without the post-processing (YES in step S105).

In step S106, the CPU 205 sets the output destination 1002 to the designated output destination 602 (Printer#1). The output destination 1002 is the same as the designated output destination 602, and the security does not deteriorate. In step S110, the printing immediately starts (the post-authentication output 1003 is NO).

Referring to FIG. 17, the sub-set of sixth to tenth pages is designated to be output to the Printer#1 without the stapling 1611. Referring to the device capacity information table in FIG. 16, the sheet with the stapling 1611 can be output to the Printer#1 (YES in step S105).

In step S106, the CPU 205 sets the output destination 1002 to the designated output destination 602 (Printer#1). The output destination 1002 is the same as the designated output destination 602, and the security does not deteriorate. In step 5110, the printing immediately starts (the post-authentication output 1003 is NO).

Referring to FIG. 17, the sub-set of eleventh to thirty-fifth pages is designated to be output to the Printer#1 with the multi-hole punching 1613. Referring to the device capacity information table in FIG. 16, the sheet of the page with the multi-hole punching 1613 can be output the Printer#1 (YES in step S105).

In step S106, the CPU 205 sets the output destination 1002 to the designated output destination 602 (Printer#1). The output destination 1002 is the same as the designated output destination 602, and the security does not deteriorate. In step 5110, the printing immediately starts (the post-authentication output 1003 is NO).

Referring to FIG. 17, the sub-set of thirty-sixth to thirty-eighth pages is designated to be output to the Printer#1 with case bookbinding. Referring to the device capacity information table in FIG. 16, the sheet with the case bookbinding cannot be output to the Printer#1 (NO in step S105).

In step S107, the CPU 205 sets the output destination 1002 to a substitute output destination (Printer#2), and transfers the page from the Printer#1 to Printer#2.

The Printer#1 is set to the lockable Room#1, and the Printer#2 is set to the unlocked Room#2. Therefore, the security 503 of the designated output destination 602 is high (YES in step S108). The security 503 of the output destination 1002 is low (NO in step S109), and the security deteriorates because of the change of the output destination.

Therefore, the printing of page does not immediately start. In step S111, the print job is registered as the post-authentication print job (the post-authentication output 1003 is YES).

According to the present exemplary embodiment, if the output of the sheet designated to the output destination to which the confidentiality is secured is changed to the output destination available for other persons due to the limit of the post-processing subjected to the sheet, the printing of the sheet can be canceled, and can be switched to the post-authentication printing. The output destination with the secured confidentiality is the Printer#1, and the output destination available for other persons is the Printer#2.

Thus, it is possible to improve the security by preventing the output product with high confidentiality from being viewed or brought out.

Further, it is possible to immediately start the printing of an output of the sheet without the deterioration of security before the user authentication.

More specifically, regarding a sheet whose output destination is not changed, a sheet that is output to the output destination available for other persons, and a sheet that is output to the output destination with secured confidentiality, the printing thereof immediately starts without waiting for the user authentication. The output destination available for other persons is the Printer#2, and the output destination with secured confidentiality is the Printer#1.

Thus, in a case where different print settings to the sub-set in the print job or the pages are possible, the waiting time of the user is shortened and the security can be improved.

According to the exemplary embodiments described above, the printing apparatus 10 executes the print job including a plurality of the sub-sets. When the printing apparatus 10 executes the print job without the unit of the sub-set, the control according to the exemplary embodiments described above may be executed.

The print job without the unit of the sub-set is the print job 2001 in FIG. 6 and a single or a plurality of pages 2003. The print job may be executed by a method illustrated in FIG. 9 or 12. Thus, the processing according to the present invention can be applied to the print job without the unit of the sub-set.

The user designates the stacker 1 as a discharge destination of a plurality of pages included in the print job, and performs stapling the sheet on which the image is printed based on a plurality of pages. If receiving and executing the print job, the printing apparatus 10 does not discharge the sheet with the staple to the stacker 1 due to the configuration of the printing apparatus 10. The printing apparatus 10 registers the print job as the post-authentication print job to the HDD 208. Then, the printing apparatus 10 prints the post-authentication print job with a sequence in FIG. 12.

According to the present exemplary embodiment described above, as the first discharge unit, a discharge unit to require the user authentication based on the authentication information to extract the sheet is described. However, the present invention is not limited to this. The first discharge unit may be a lockable discharge unit with a physical key.

Similar to the use of the authentication information, the first discharge unit is a discharge unit that can limit the extraction of the sheet, and the second discharge unit is a discharge unit that cannot limit the extraction of the sheet. In this case, the printing apparatus 10 stores information indicating whether the discharge unit is lockable with a physical key to the HDD 208. Based on the stored information, the printing apparatus 10 may perform the control according to the present exemplary embodiment.

According to the exemplary embodiments, the configuration can be, e.g., a system, an apparatus, a method, a program, or a storage medium. Specifically, the present invention may be applied to a system having a plurality of devices, or an apparatus having a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-014377 filed Jan. 26, 2012, which is hereby incorporated by reference herein in its entirety.

What is claimed is:

1. A printing apparatus capable of outputting a sheet to one of a first discharge unit and a second discharge unit, the printing apparatus comprising:
   a receiving unit configured to receive a print job designating the first discharge unit or the second discharge unit to execute post-processing and output the print job, wherein the first discharge unit is configured to require authentication information to extract the sheet and the second discharge unit is configured not to require the authentication information to discharge the sheet; and
   a control unit configured to control the printing apparatus to execute post-processing to a sheet on which an image is printed by executing the print job and to output the sheet to the second discharge unit when the print job received by the receiving unit designates the second discharge unit to execute the post-processing and output the print job,
   wherein the control unit controls the printing apparatus to store in a storage unit, as a post-authentication print job whose printing starts after authentication using the authentication information, the print job received by the receiving unit when the print job designates the first discharge unit to execute the post-processing and output the print job.

2. The printing apparatus according to claim 1, wherein the control unit executes the print job in response to reception of the authentication information from a user after the print job is stored as the post-authentication print job in the storage unit.

3. The printing apparatus according to claim 1, further comprising:
   a notifying unit configured to notify that the print job is stored in the storage unit, as the post-authentication print job.

4. The printing apparatus according to claim 1,
   wherein the print job includes a plurality of sub-sets, and an output destination and post-processing can be designated for each sub-set of the plurality of sub-sets,
   wherein the control unit controls the printing apparatus to execute the post-processing to the sheet on which an image is printed by executing the print job and to output the sheet to the second discharge unit when the sub-set included in the plurality of sub-sets is designated to both execute the post-processing and output to the second discharge unit, and
   wherein the control unit controls the printing apparatus to store in the storage unit the sub-set as the sub-set for starting printing after the authentication using the authentication information when the sub-set included in the plurality of sub-sets is designated to both execute the post-processing and output the sheet to the first discharge unit.

5. A printing apparatus capable of outputting a sheet to one of a first discharge unit that can limit extraction of the sheet and a second discharge unit, the printing apparatus comprising:
   a receiving unit configured to receive a print job designating the first discharge unit or the second discharge unit to execute post-processing and output the print job, wherein the first discharge unit is configured to require authentication information to extract the sheet and the second discharge unit is configured not to require the authentication information to discharge the sheet; and
   a control unit configured to control the printing apparatus to execute post-processing to the sheet on which an image is printed by executing the print job and to output the sheet to the second discharge unit when the print job received by the receiving unit designates the second discharge unit to execute the post-processing and output the print job,
   wherein the control unit controls the printing apparatus to store in a storage unit the print job as a post-authentication print job whose printing of the print job starts after authentication using the authentication information when the print job received by the receiving unit designates the first discharge unit to execute the post-processing and output the print job.

6. A control method for controlling a printing apparatus capable of outputting a sheet to one of a first discharge unit that can limit extraction of the sheet and a second discharge unit, the control method comprising:
   receiving a print job designating the first discharge unit or the second discharge unit to execute post-processing and output the print job, wherein the first discharge unit is configured to require authentication information to extract the sheet and the second discharge unit is configured not to require the authentication information to discharge the sheet; and
   controlling the printing apparatus to execute the post-processing to the sheet on which an image is printed by executing the print job and to output the sheet to the second discharge unit when the received print job designates the second discharge unit to execute the post-processing and output the print job,
   wherein the controlling step controls the printing apparatus to store in a storage unit the print job, as a post-authentication print job whose printing of the print job starts after authentication using the authentication information, when the received print job designates the first discharge unit to execute the post-processing and output the print job.

7. A non-transitory computer-readable storage medium storing computer-executable instructions, which when loaded into a computer and executed perform a method for controlling a printing apparatus to output a sheet to one of a first discharge unit that can limit extraction of the sheet and a second discharge unit, the method comprising:
   receiving a print job designating the first discharge unit or the second discharge unit to execute post-processing and output the print job, wherein the first discharge unit is configured to require authentication information to extract the sheet and the second discharge unit is configured not to require the authentication information to discharge the sheet; and
   controlling the printing apparatus to execute the post-processing to the sheet on which an image is printed by executing the print job and to output the sheet to the second discharge unit when the received print job designates the second discharge unit to execute the post-processing and output the print job,
   wherein the controlling step controls the printing apparatus to store in a storage unit the print job, as a post-authentication print job whose printing of the print job starts after authentication using the authentication information, when the received print job designates the first discharge unit to execute the post-processing and output the print job.

* * * * *